United States Patent [19]

Sczepanski

[11] 4,356,491

[45] Oct. 26, 1982

[54] MARINE DIRECTION FINDING SYSTEM

[76] Inventor: Lee Sczepanski, 6702 W. 164th Pl., Tinley Park, Ill. 60477

[21] Appl. No.: 175,869

[22] Filed: Aug. 6, 1980

[51] Int. Cl.³ ............................ G01S 3/02; G09F 9/00
[52] U.S. Cl. .................................. 343/113 R; 116/298; 116/309; 116/310
[58] Field of Search .................... 340/752; 343/113 R; 116/309, 310, 298

[56] References Cited

U.S. PATENT DOCUMENTS

| | | | |
|---|---|---|---|
| 1,917,268 | 7/1933 | Mirick | 343/113 R |
| 2,232,096 | 2/1941 | Dane | 343/113 R X |
| 2,933,727 | 4/1960 | Padgett | 343/113 R |
| 3,028,599 | 4/1962 | Beck | 343/113 R |
| 3,736,061 | 5/1973 | Knowlden et al. | 343/113 R X |

*Primary Examiner*—Malcolm F. Hubler
*Attorney, Agent, or Firm*—Hill, Van Santen, Steadman, Chiara & Simpson

[57] ABSTRACT

A marine direction finding system is disclosed wherein a rotatable and calibrated dial is placed over a direction indicating dial of a radio direction finder. The radio direction finder indicates direction by illuminating a portion of its indicating dial. The direction of the radial signal received is referenced to a front of the boat which is calibrated as 0°. The rotatable dial is preferably at least semitransparent and is calibrated at a first radius from 0° to 360° and at a second radius also from 0° to 360° but offset by 180°. When a signal is received, the rotatable dial first radius marking is set to a 0° marking on the direction finder in accordance with the current magnetic heading for both. The indicated direction on the radio direction finder indicating dial then illuminates through the rotatable dial and a corresponding reading on the rotatable dial from the first radius markings corresponds to a magnetic heading of the first boat to the second boat and the second radius reading corresponds to a heading for the second boat to the first boat.

8 Claims, 6 Drawing Figures

MARINE DIRECTION FINDING SYSTEM

BACKGROUND OF THE INVENTION

Electronic direction finding systems are in prevalent use for marine navigation and more particularly when a first boat having a marine direction finder desires to locate a second boat sending a radio signal received by the direction finder. With the systems now on the market such as by the Regency Corporation, a direction indicating dial is provided which is calibrated between 0° and 360°. The unit is calibrated such that 0° corresponds to the front of the boat. When a signal is received, the direction of the received signal is indicated by a selective illumination on the dial. Consequently, the heading of a second boat which is sending the signal to the first boat is indicated. However, this heading is not referenced to magnetic north and consequently computations must be made both by the first boat and the second boat to figure out its own magnetic heading in order to travel from the first boat to the second boat or from the second boat to the first boat. Calculating such magnetic headings is time consuming and troublesome for operators of marinecraft, especially recreational craft.

SUMMARY OF THE INVENTION

It is an object of the invention to provide a marine direction finding system and method wherein an operator of a radio direction finding system can virtually instantaneously determine a magnetic direction for travelling from his boat having the radio direction finder to a second boat or the appropriate magnetic hading for the second boat to the first boat.

According to the marine direction finding system of the invention, a rotatable dial is rotatably connected in front of the direction indicating dial of the direction finder. The rotatable dial has a first radius calibrated from 0° to 360° and a second preferably inner radius calibrated also from 0° to 360° but with a 180° offset. Preferably the rotatable dial is at least semitransparent and when a selective illumination indicating direction on the radio direction finder occurs, such illumination can be viewed through the rotatable dial.

When a radio signal is received by a first boat, the operator sets the rotatable dial outer calibration to the current magnetic heading of the first boat from a magnetic heading indicator. He then reads off from the outer radius a heading to the second boat where the dial is selectively illuminated. Adjacent this reading he can also read off from the second radius the appropriate magnetic heading for the second boat to the first boat.

DESCRIPTION OF THE PREFERRED EMBODIMENTS

Figure 1:
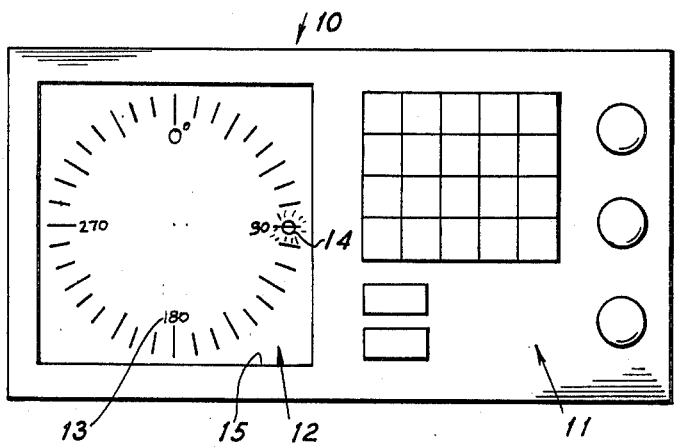
FIG. 1 is a front view of a typical radio direction finder utilized in the system of the invention.

A direction finding radio utilized in the system of the invention is generally shown at 10 in FIG. 1. Such a radio typically has an instrument panel 11 and a direction indicator dial face 12. Typically indicia 13 from 0° through 360° for showing direction are printed in association with the indicating dial 12. In one type of radio, a direction indicating light becomes selectively illuminated such as at 14 indicating 90° when a signal is received 90° relative to a front of the boat. Normally 0° is calibrated to indicate a heading directly towards the front of the boat. A frame 15 typically surrounds the dial 12.

The radio direction finder of FIG. 1 typically has no relationship to true magnetic north but rather is calibrated to the front of the boat.

Figure 2:
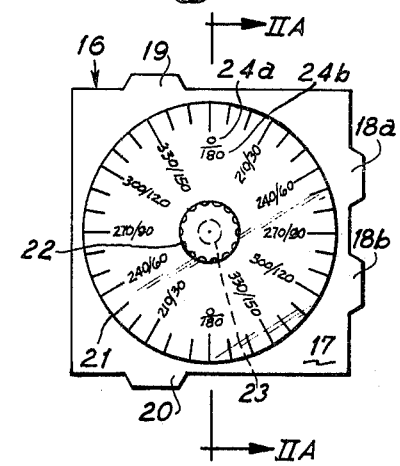
FIGS. 2 and 2A are front and side views of a rotatable dial and mounting plate which is fitted over the indicating dial of the radio direction finder of FIG. 1.
Figure 2A:
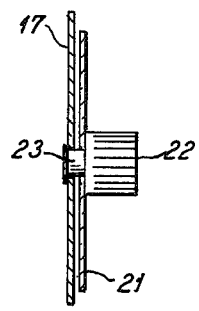

As shown in FIG. 2, a magnetic heading conversion dial 16 is provided formed of a plastic mounting insert 17 typically of a frosted glass having a semitransparent characteristic. To this mounting insert 17 a plastic rotatable dial 21 is affixed such as by a rivet 23 more clearly shown in FIG. 2A. A knob 22 also is mounted on the rivet 23.

The mounting insert 17 preferably has side mounting tabs 18a,b and a top or bottom mounting tab 19 or 20. These mounting tabs engage with the frame 15 on the radio direction finder so as to mount the rotatable dial in front of the radio direction finder dial face.

The rotatable dial 21 is disc-like and preferably is at least semi-transparent. In this fashion, the selective illumination of light such as at 14 on the radio direction finder can be viewed through both the mounting insert 17 and the rotatable dial 21. By retaining a "frosting" characteristic on the mounting insert (less than 100% transparency), the existing indicia on the dial pattern are somewhat masked so they are not to be confused with the new indicia on the rotatable dial 21.

The rotatable dial 21 at a first outer radius is calibrated from 0° through 360° by indicia 24a. Similarly additional calibrating indicia 24b are provided at an inner radius from 0° through 360° but with a 180° offset such that 0° of the outer radius indicia is directly adjacent 180° of the inner radius indicia.

Figure 3:
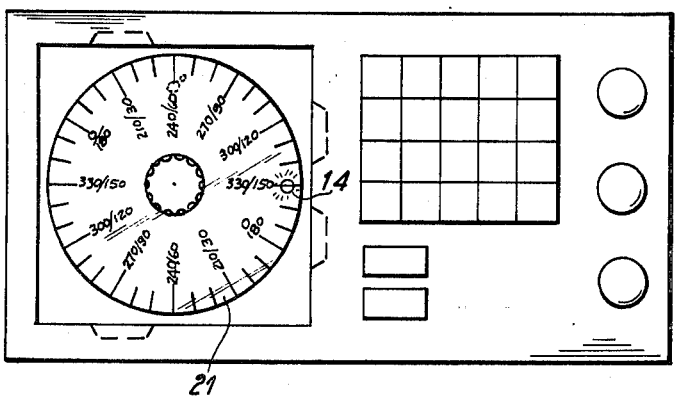
FIG. 3 is a front view of the radio direction finder of FIG. 1 with the rotatable dial of FIG. 2 in place.

FIG. 3 shows the magnetic heading conversion dial of FIG. 2 mounted in place on the radio direction finder of FIG. 1 and shows a selective illummination point 14 shining through corresponding to a received signal 90° from the front of the boat.

Figure 4:
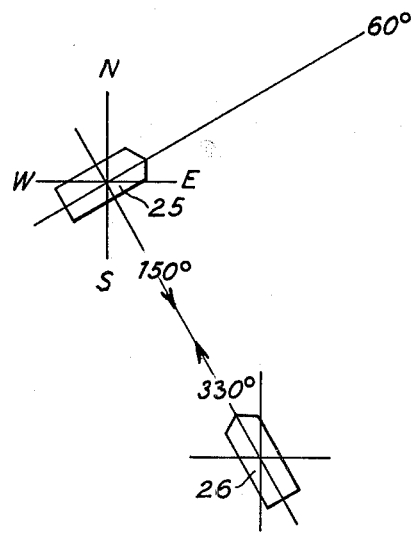
FIG. 4 is a navigational diagram for illustrating operation of the inventive system.

Operation of the inventive system will now be explained relative to FIG. 4. Boat 25 is a first boat having the radio direction finding system of the invention which receives a signal from a second boat 26. The operator of boat 25 will set the rotatable dial according to its outer radius indicia such that 60° is adjacent the 0° marking on the original radio direction finder as shown in FIG. 3. 60°, of course, is the magnetic heading of boat 25. Now, when the signal is received, the radio direction finder will selectively illuminate a point at 14 on the dial 13 which on the original radio direction finder dial might correspond to a 90° marking but on the rotatable dial 21 corresponds to 150°/330°. The operator of the vessel then immediately knows that his magnetic heading to travel to boat 26 would be 150°. Also, the operator of boat 25 may now radio boat 26 and inform him that to steer a course to boat 25 boat 26 should assume a magnetic heading of 330°. Importantly, the operator of boat 1 has all of the information at his fingertips without the need for any calculations. Also, as minor adjustments occur in the magnetic heading of boat 25 a simple readjustment of the rotatable dial will correct for such newly assumed magnetic heading of boat 25 without the need for recalculation. For headings which are not even multiples of 10, such calculations could of course become quite tedious for the operator of the marinecraft.

Figure 5:
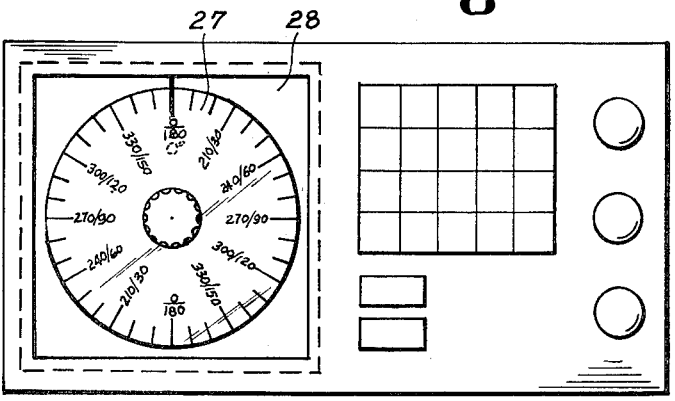
FIG. 5 is a front view of a radio direction finder similar to FIG. 1 but with the rotatable dial used in the direction finding system of the invention mounting by a manufacturer.

As shown in FIG. 5, a manufacturer of the radio direction finder may directly install via a plastic mounting plate 28 a rotatable dial 27 of the type described in FIG. 3. The manufacturer would also place a 0° reference marking on the plastic mounting plate 28.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A marine direction finding system for use on a boat having a magnetic heading indicator, comprising:
    (a) a radio direction finder means having a direction indicating dial and which indicates a direction bearing between 0° and 360° of a received signal relative to a front of the boat by illumination at a corresponding portion of the dial so as to indicate bearing;
    (b) an at least semi-transparent mounting plate and means for attaching the mounting plate in front of the indicating dial; and
    (c) a manually settable and rotatable dial which is set to a magnetic heading of the magnetic heading indicator formed as an at least semi-transparent disc rotatably connected to the mounting plate, said rotatable dial being calibrated at a first radius from 0° to 360° and at a second radius also from 0° to 360° in the same rotational direction of marking as the first radius calibration but offset by 180°.

2. The system of claim 1 wherein a control knob is mounted on the rotatable dial.

3. The system of claim 1 wherein the direction finder indicating dial has calibration markings for 0° to 360° and the mounting plate is designed to disperse light sufficiently to partially obscure the indicating dial calibration markings.

4. The system of claim 1 wherein the mounting plate has a 0° marking thereon.

5. The system of claim 1 wherein the means for attaching comprises projecting tabs on the mounting plate and wherein the mounting plate is flexible.

6. The system of claim 1 wherein a first radius 0° marking is aligned adjacent a second radius 180° marking.

7. A method for marine radio direction finding wherein a first boat with a direction finder can determine a magnetic bearing heading in degrees to a second boat sending a radio signal and a magnetic bearing heading in degrees for the second boat to the first boat, the direction finder on the first boat having a direction indicating dial with a 0° marking and which indicates a direction bearing between 0° and 360° of the received radio signal relative to a front of the boat at a corresponding portion of the dial indicating bearing, comprising the steps of:
    providing a translucent rotatable dial formed as a disc mounted for rotation in front of the direction finder indicating dial, the rotatable dial being calibrated at a first radius from 0° to 360° and at a second radius also from 0° to 360° in the same rotational direction but offset by 180°;
    determining a magnetic heading of the first boat;
    setting the rotatable dial first radius calibration corresponding to said magnetic heading of the first boat to the 0° marking on the indicating dial; and
    observing through the translucent dial the direction finder indicating dial direction indication corresponding to the radio signal from the second boat, and reading off at the location of the direction indication from the rotatable dial first radius the magnetic heading for the first boat to the second boat and from the second radius the magnetic heading for the second boat to the first boat.

8. The method of claim 8 wherein the indicating dial is selectively illuminated to show the direction indication, the rotatable dial is at least semi-transparent, and the first and second radius magnetic heading readings are located by viewing the selective illumination through the rotatable dial.

* * * * *